United States Patent
Ash et al.

(10) Patent No.: US 6,775,738 B2
(45) Date of Patent: Aug. 10, 2004

(54) METHOD, SYSTEM, AND PROGRAM FOR CACHING DATA IN A STORAGE CONTROLLER

(75) Inventors: Kevin John Ash, Tucson, AZ (US); Brent Cameron Beardsley, Tucson, AZ (US); Michael Thomas Benhase, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 259 days.

(21) Appl. No.: 09/932,765

(22) Filed: Aug. 17, 2001

(65) Prior Publication Data

US 2003/0037204 A1 Feb. 20, 2003

(51) Int. Cl.[7] .................................................. G06F 12/00
(52) U.S. Cl. ..................... 711/113; 711/114; 711/129
(58) Field of Search ................................ 711/113, 114, 711/118, 170, 129

(56) References Cited

U.S. PATENT DOCUMENTS

| | | |
|---|---|---|
| 5,235,690 A | 8/1993 | Beardsley et al. |
| 5,307,473 A | 4/1994 | Tsuboi et al. |
| 5,535,372 A | 7/1996 | Benhase et al. |
| 6,023,720 A | 2/2000 | Aref et al. |
| 6,105,116 A | 8/2000 | Mori |

*Primary Examiner*—Kevin Verbrugge
(74) *Attorney, Agent, or Firm*—Konrad Raynes & Victor LLP; David W. Victor

(57) ABSTRACT

Provided is a method, system, and program for caching updates to one target storage device in a first and second memories, wherein the target storage device is one of a plurality of storage devices. A determination is made of an allocation of available space in the second memory to the storage devices, wherein a total of the allocation of the available space to all the storage devices exceeds one hundred percent of the available space in the second memory. An update to one target storage device is received and then a determination is made as to whether adding the update to the second memory will exceed the allocation of available space for the target storage device in the second memory. One copy of the update is written to the second memory if adding the update to the second memory will not exceed the allocation of available space for the target storage device.

39 Claims, 5 Drawing Sheets

US 6,775,738 B2

METHOD, SYSTEM, AND PROGRAM FOR CACHING DATA IN A STORAGE CONTROLLER

BACKGROUND OF THE INVENTION

1. Field of the Invention

The present invention relates to a system, method, and program for caching data in a storage controller.

2. Description of the Related Art

High end storage controllers, such as the International Business Machines Corporation (IBM) Enterprise Storage Server** manage Input/Output (I/O) requests from networked hosts to one or more storage devices, such as a direct access storage device (DASD), Redundant Array of Independent Disks (RAID Array), and Just a Bunch of Disks (JBOD). Storage controllers include one or more host bus adaptor (HBA) cards to communicate with one or more hosts over a network and adaptors to communicate with the storage devices. The storage controllers also include a cache memory and often further include a non-volatile storage device (NVS), which may be comprised of a battery backed-up random access memory. In a Fast Write operation, the storage controller writes data updates to both the cache and NVS. The NVS is used to provide an extra copy of the data update in the event that the copy of the update in cache is lost as a result of a system failure. The storage controller returns a write complete message to the host that initiated the update request upon completing the write to both the cache and NVS, but before the data is actually written to the storage device. The cached data is then subsequently destaged to the target storage device. Once destaged to disk, the update copy in the cache and NVS may be removed. Typically, the NVS has a substantially smaller storage space than the cache memory.

**Enterprise Storage Server and IBM are trademarks of International Business Machines Corporation.

In implementations where there are multiple storage devices connected to the storage controller, such as multiple ranks of Redundant Arrays of Inexpensive disks (RAID), the cache and NVS unit of the storage controller may store updates intended for the multiple storage devices. In the prior art, in the event that the NVS is substantially filled with updates for one target storage device and that target storage device fails, then complete status cannot be returned for writes directed toward the surviving storage devices if the NVS is filled with the data from the failed storage device. Complete status is not returned unless the update is copied to both cache and the NVS. Moreover, even in cases where the storage device whose updates dominate the NVS does not fail, if the storage device dominating NVS is processing I/Os at a slow rate, then other processes submitting I/Os to other devices are delayed to the rate that updates are destaged to the slower, dominating storage device. Destage operations to the dominating storage device may be running at a slow rate if one or more disk drives in the storage device are being rebuilt as a result of a failed drive or if the updates to the dominating storage device in NVS comprise mostly random (non-sequential) updates. Random updates take longer to destage because they have longer disk access times and, in a RAID environment, require constant parity recalculations for each random update.

For these reasons, there is a need in the art to provide techniques for managing write operations to improve cache performance.

SUMMARY OF THE PREFERRED EMBODIMENTS

Provided is a method, system, and program for caching updates to one target storage device in a first and second memories, wherein the target storage device is one of a plurality of storage devices. A determination is made of an allocation of available space in the second memory to the storage devices that applies throughout an entire session of operation during which updates are received. Throughout the entire session, when an update to one target storage device is received, a determination is made as to whether adding the update to the second memory will exceed the allocation of available space for the target storage device in the second memory. One copy of the update is written to the second memory if adding the update to the second memory will not exceed the allocation of available space for the target storage device.

Further provided is a method, system, and program for caching updates to one target storage device in a first and second memories, wherein the target storage device is one of a plurality of storage devices. A determination is made of an allocation of available space in the second memory to the storage devices, wherein a total of the allocation of the available space to all the storage devices exceeds one hundred percent of the available space in the second memory. An update to one target storage device is received and then a determination is made as to whether adding the update to the second memory will exceed the allocation of available space for the target storage device in the second memory. One copy of the update is written to the second memory if adding the update to the second memory will not exceed the allocation of available space for the target storage device.

In further implementations, the determination of the allocation of space in the second memory allocates a percentage of NVS to each storage device that is greater than a total available storage space in the NVS divided by a number of the plurality of storage devices.

In further implementations, the target storage device may be comprised of multiple storage units.

In yet further implementations the target storage device comprises a RAID device, wherein data is written in stripe units across the multiple storage units when writing data to the target storage device. In such case, a determination is made as to whether the update is a sequential update that is part of a sequential access to the target storage device. Before receiving enough sequential updates to the target storage device to fill one stripe unit, an indication is made that the sequential updates are not ready to destage to the target device. After receiving enough sequential updates to fill one stripe unit in the target storage device, an indication is made that the sequential updates are ready to destage to the target device by writing the sequential updates to one stripe unit in the target storage device.

Still further, applying the update to the second memory is deferred if an amount of storage space in the second memory used by updates to the target storage device after the update is applied would exceed the allocation of space for the target storage device.

In implementations where applying the update is deferred, upon performing a destage of one update in the second memory to one target storage device, the destaged update is marked for removal from the second memory and a request is made for resubmittal of one deferred update to the target storage device if the amount of space used by updates for the target storage device in the second memory is less than the allocation of space in the second memory for the target storage device.

The described implementations provide a technique for ensuring that a portion of the second memory or non-volatile memory may is allocated to each storage device to avoid the situation where the failure or processing delays of one storage device prevents updates to other storage devices from being cached in the second memory.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof and which illustrate several embodiments of the present invention. It is understood that other embodiments may be utilized and structural and operational changes may be made without departing from the scope of the present invention.

Figure 1:
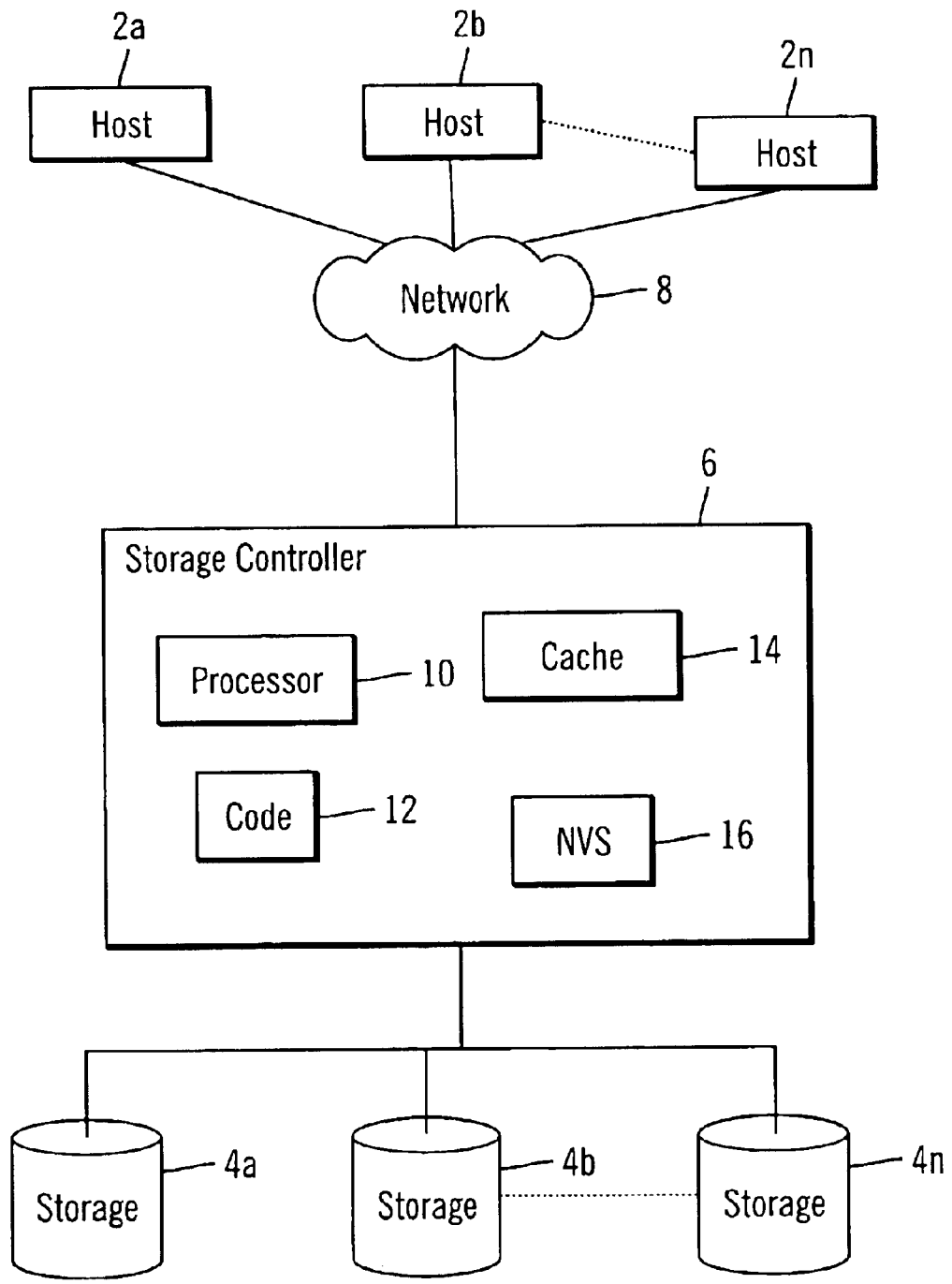
FIG. 1 illustrates a computing environment in which aspects of the invention are implemented.

FIG. 1 illustrates a computing environment in which aspects of the invention are implemented. A plurality of host systems $2a, b \ldots n$ transmit Input/Output (I/O) requests to one or more storage devices $4a, b \ldots n$ through a storage controller 6 which manages access to the storage devices $4a, b \ldots n$. In certain implementations, the storage devices $4a, b \ldots n$ are comprised of a plurality of hard disk drives organized as Just a Bunch of disks (JBOD), a RAID array, DASD, etc. Further, a storage device $4a, b \ldots n$ may comprise a logical storage device, such as a RAID or JBOD rank. The host systems $2a, b \ldots n$ communicate with the storage controller 6 over a network 8, such as the Internet, a Storage Area Network (SAN), an Intranet, Local Area Network (LAN), Wide Area Network (WAN), etc., using a communication protocol such as TCP/IP, Fibre Channel, Ethernet, etc.

The storage controller 6 includes a processor 10 executing code 12 to perform storage controller operations. The storage controller 6 further includes a cache 14 and non-volatile storage unit 16, such as a battery backed-up memory device. The storage controller 6 stores in cache 14 data updates received from the hosts $2a, b \ldots n$ to write to the storage devices $4a, b \ldots n$ as well as data read from the storage devices $4a, b \ldots n$ to return to the hosts $2a, b \ldots n$. When operating in Fast Write mode, data updates received from the hosts $2a, b \ldots n$ are copied to both cache 14 and the NVS 16. End status is returned to the host $2a, b \ldots n$ sending the data update after the update is copied to both the cache 14 and NVS 16.

Figure 2:
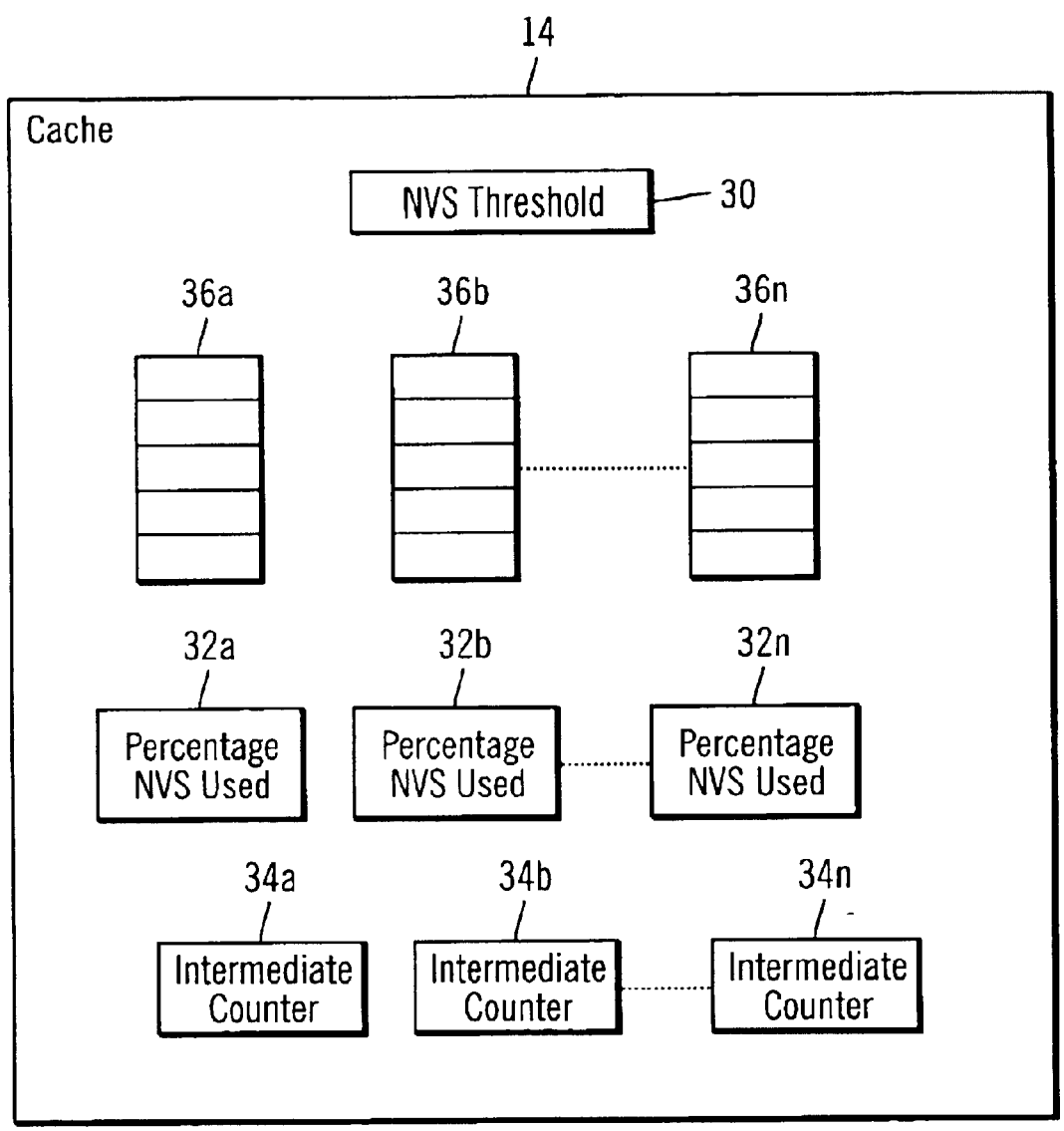
FIG. 2 illustrates data structures maintained in the storage controller cache in accordance with implementations of the invention.

FIG. 2 illustrates further detail of the information the storage controller 6 maintains in cache 14 or some other storage or memory location. The cache 14 maintains an NVS threshold 30 indicating a maximum amount of storage space in the NVS 16 that may be used for updates to each storage device $4a, b, \ldots n$. The cache 14 further maintains two variables for each storage device, a percentage of NVS used $32a, b \ldots n$ that indicates, for each storage device, the percentage of NVS 16 storing updates for the storage device $4a, b \ldots n$ and an intermediate counter $34a, b \ldots n$. In addition, for each storage device $4a, b \ldots n$, the cache 14 also includes a reconnect queue $36a, b \ldots n$. Each reconnect queue $36a, b \ldots n$ includes entries of reconnect parameters to allow the processor 10 to reconnect to a channel to which the storage controller 6 issued a disconnect in response to receiving updates to a target storage device $4a, b \ldots n$ when the NVS 16 already stored the threshold amount of storage space for that target storage device $4a, b \ldots n$.

Figure 3:
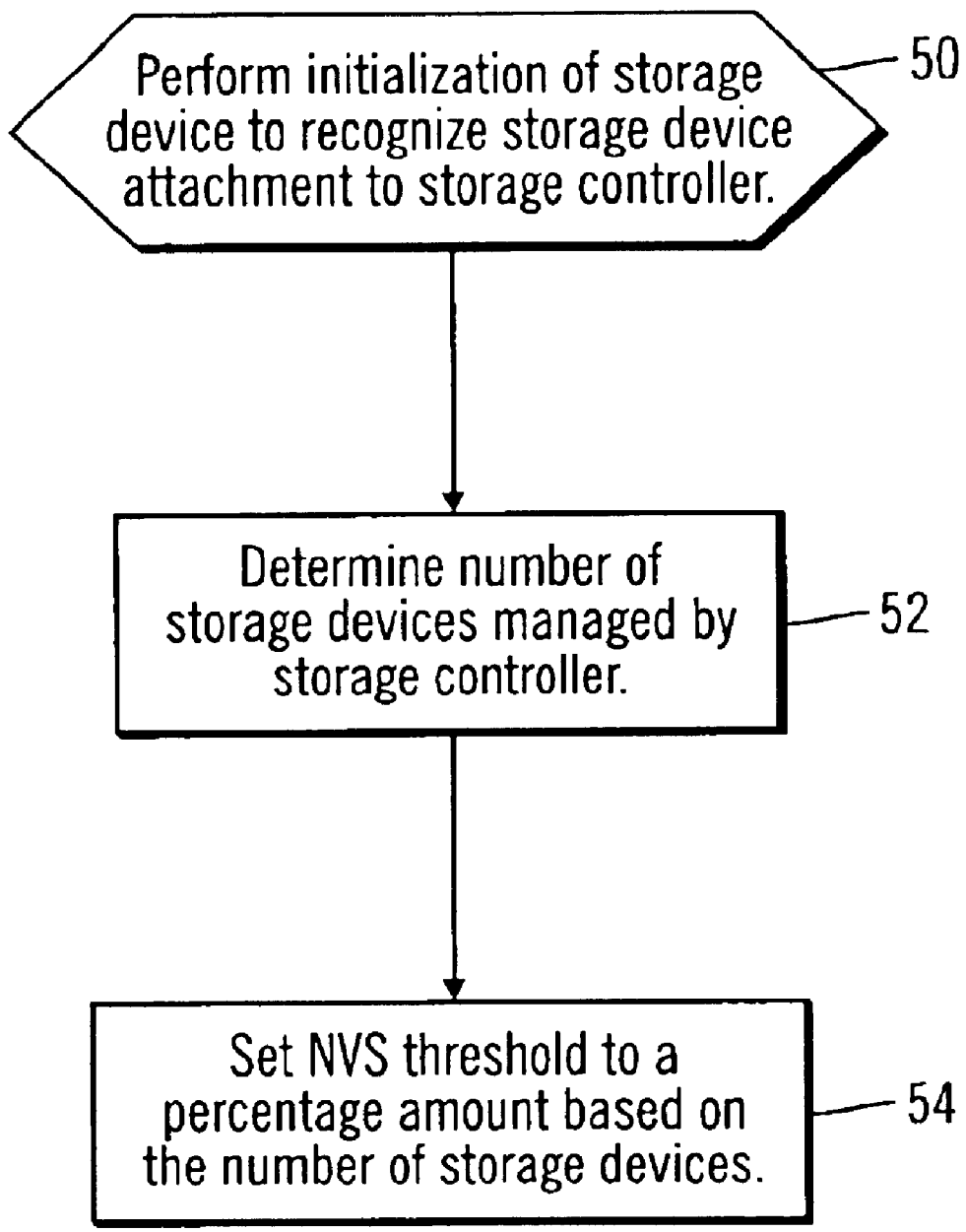
FIG. 3 illustrates logic to initialize an NVS threshold in accordance with implementations of the invention.

In certain implementations where the storage device $4a, b \ldots n$ is comprised of multiple disk drive units, such as the case with a RAID array, sequential updates are not destaged until an entire stripe unit of sequential updates is accumulated in the cache 14. After accumulating a stripe unit of updates, the updates are then destaged and striped to the disks of the target storage device $4a, b \ldots n$ FIG. 3 illustrates logic implemented in the code 12 to set the NVS threshold 30. At block 50, the processor 10 performs an initialization of one or more of the storage devices $4a, b \ldots n$ as part of an initialization routine. This initialization routine may be invoked during a reboot or restart operation in which the processor 10 would initialize all the storage devices $4a, b \ldots n$. Moreover, the initialization routine may be performed if a storage device or component thereof, such as a disk within the storage device, is removed or added from the group of storage devices $4a, b \ldots n$ managed by the storage controller 6, such as the case of a hot reboot. At block 52, the processor 10 determines the number of storage devices $4a, b \ldots n$ attached to the storage controller 6. Based on the number of storage devices $4a, b \ldots n$, the processor 10 sets (at block 54) the NVS threshold 30 to a percentage that exceeds each storage devices $4a, b \ldots n$ pro rata share of the total available storage space in the NVS 16. For example, the NVS threshold 30 may be set as follows, based on the number of storage devices $4a, b \ldots n$, where the storage device may comprise a physical storage device or logical storage device, e.g., RAID or JBOD rank:

if there is one storage device, then the NVS threshold 30 is set to 100%.

if there are two or three storage devices, then the NVS threshold 30 is set to 50%.

if there are four or more RAID ranks, the NVS threshold 30 is set to 25%.

if there are four to six JBOD ranks, with no RAID ranks, then the NVS threshold 30 is set to 20%.

if there are seven or more JBOD ranks, then the NVS threshold 30 is set to 10%.

In certain implementations, the above rules for determining the NVS threshold 30 do not divide NVS equally among all storage devices $4a, b \ldots n$ but allows a relatively busier storage device $4a, b \ldots n$ to use greater than its pro rata share of NVS 16 and at the same time, leave enough space in the NVS 16 available so that the failure of a relatively busy storage device $4a, b \ldots n$ will not prevent the NVS 16 from receiving updates to the surviving storage devices. For example, according to the above defined rules, if there are ten RAID ranks and one utilizes 25% of NVS 16 and fails, then the surviving nine RAID ranks have 75% of the NVS 16 to use. In this way, NVS 16 space is over allocated on a storage device basis to accommodate those storage devices $4a, b \ldots n$ that are particularly busy, and at the same time limit the allocation of NVS 16 to avoid delays in processing updates to the other storage devices $4a, b \ldots n$ in the event that the storage device $4a, b \ldots n$ whose updates dominate NVS 16 fails or when the destaging operations to the dominating storage device 4a, b . . . n are particularly slow. As mentioned, destage operations to a storage device 4a, b . . . n may proceed at a particularly slow rate as a result of background operations on the storage device 4a, b . . . n, such as an operation to rebuild a disk drive, or a large proportion of random (non-sequential) updates.

Those skilled in the art will appreciate that there are alternative techniques that may be used to set the NVS threshold 30, such as allocate the NVS 16 space equally among the storage devices 4a, b . . . n. Still further, the NVS threshold 30 may be calculated separately for each storage device 4a, b . . . n as a weighted average of the storage capacity of the storage device 4a, b, . . . n, thereby allocating more NVS 16 space to larger storage devices relative to smaller storage devices because larger storage devices are more likely to have greater I/O activity.

In certain implementations, the above designated allocations to each storage device 4a, b . . . n may apply during an entire session during which the storage controller 6 is available and receiving I/Os. This allocation may remain static during the entire session to always assure that the updates for one particularly busy storage device 4a, b . . . n does not unduly dominate the NVS 16 with the potential for significantly adversely affecting the updates to the other less busy storage devices 4a, b . . . n.

Figure 4:
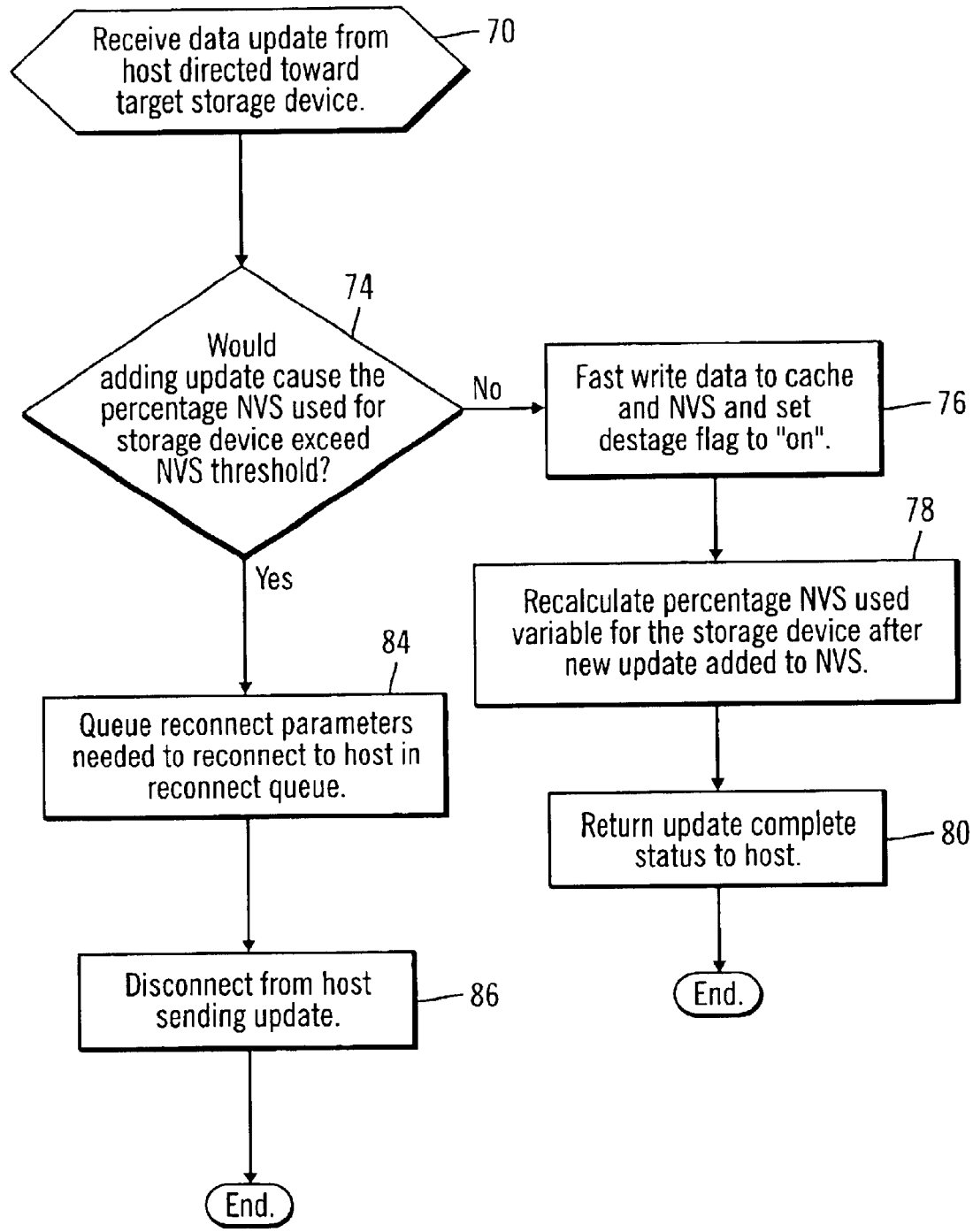
FIG. 4 illustrates logic to copy data to cache and NVS in accordance with implementations of the invention.

FIG. 4 illustrates logic implemented in the code 12 executed by the processor 10 to perform fast write operations. At block 70, the storage controller 6 receives a data update from one host 2a, b . . . n directed to one target storage device 4a, b . . . n. If (at block 74) adding the update to the NVS would not cause the percentage of NVS used variable 32a, b . . . n for the target storage device 4a, b . . . n to exceed the NVS threshold 30, then the processor 10 would fast write (at block 74) the update data into the cache 14 and NVS 16 and set the destage flag for that update to "on". The percentage NVS used variable 32a, b . . . n is then recalculated (at block 78) for the target storage device 4a, b . . . n including the new update written to NVS 16. After writing the update to the NVS 16, the processor 10 returns (at block 80) write complete status to the host 2a, b . . . n that originated the update.

If (at block 74) the NVS threshold 30 for the target storage device 4a, b . . . n would be exceeded by adding the new update, then the processor 10 queues (at block 84) reconnect parameters needed to reconnect to the host 2a, b . . . n providing the update in the reconnect queue 36a, b . . . n for the target storage device and (at block 86) disconnects from the host 2a, b . . . n sending the update. Thus, in certain implementations, the storage controller 6 will not accept updates that would cause the amount of NVS 16 used for updates to the target storage device 4a, b . . . n to exceed the NVS threshold 30.

In certain implementations, the storage controller 6 may delay destaging sequential updates in order to accumulate a large number of updates to burst out to the drive at once in a fast throughput mode. This accumulation/bursting technique is especially beneficial to performance when the target storage device 4a, b . . . n is comprised of multiple storage units, e.g., hard disk drives, and data is written in stripe units that span all the drives, such as the case with RAID devices. For such RAID storage devices, enough updates are accumulated to fill an entire stripe and then the parity is calculated for that stripe so that the entire stripe and parity can be written out at once to the storage device 4a, b . . . n.

Figure 5:
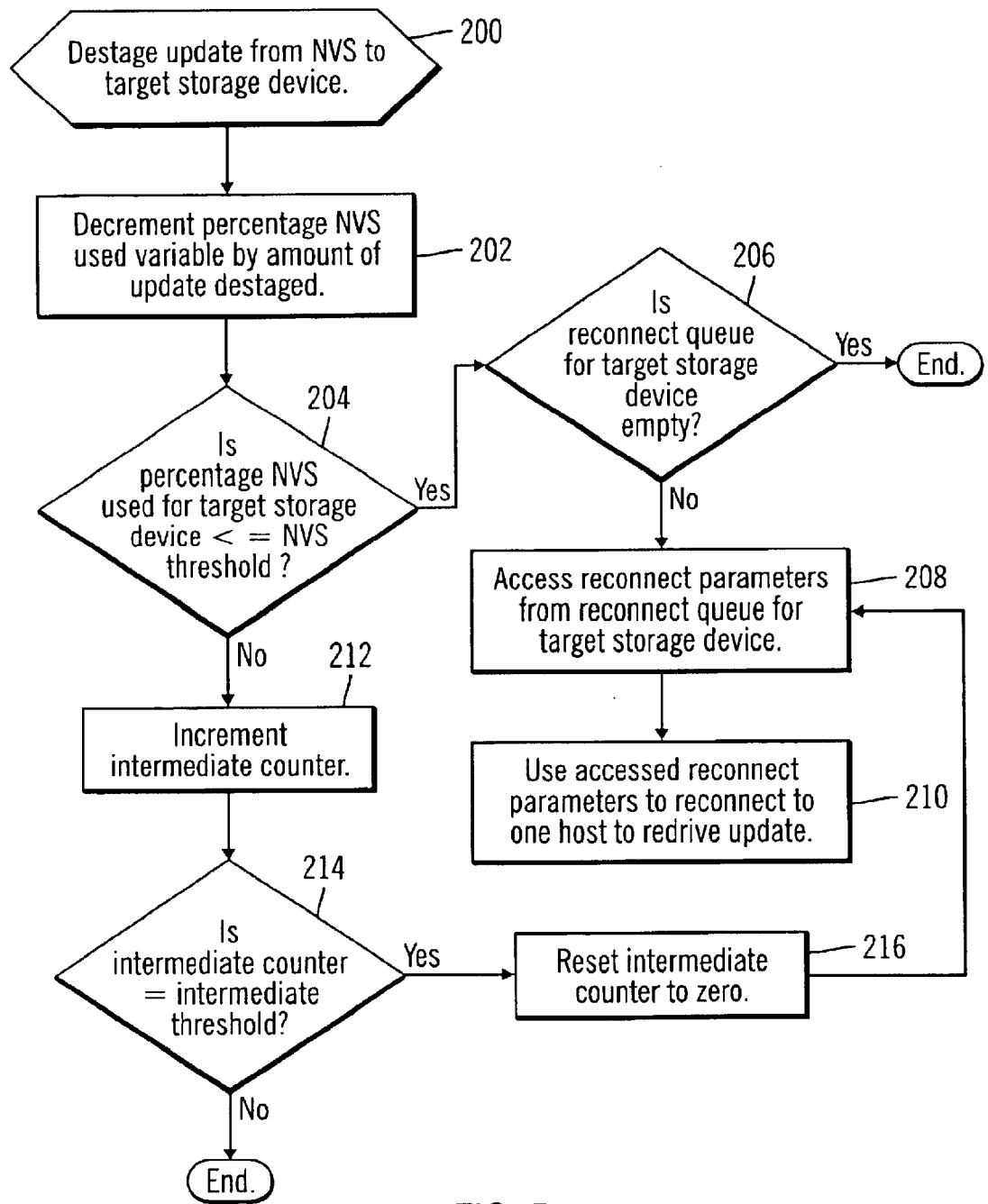
FIG. 5 illustrates logic performed when data is destaged from the NVS in accordance with implementations of the invention.

FIG. 5 illustrates logic implemented in the code 12 to reconnect to the disconnected hosts 2a, b . . . n to redrive the updates that were not accepted when disconnecting. Control begins at block 200 after destaging an update from the NVS 16 to the target storage device 4a, b . . . n. The percentage NVS used variable 32a, b . . . n for the target storage device 4a, b . . . n is decremented (at block 102) by the amount of NVS spaced used by the destaged update. If (at block 204) the just decremented percentage NVS used variable 32a, b . . . n is less than or equal to the NVS threshold 30 for the target storage device 4a, b . . . n and if (at block 206) the reconnect queue 36a, b . . . n for the target storage device 4a, b . . . n is empty, then control ends. Otherwise if there are entries in the reconnect queue 36a, b . . . n for the target storage device for which the destage is received, then the processor 10 accesses (at block 208) an entry of reconnect parameters from the reconnect queue 36a, b . . . n for the target storage device 4a, b . . . n and uses (at block 210) the accessed reconnect parameters to reconnect to the host 2a, b . . . n to redrive the update to the target storage device 4a, b . . . n If (at block 104) adding the update would increase the percentage NVS used variable 32a, b . . . n beyond the NVS threshold 30, then the intermediate counter 34a, b . . . n for the target storage device 4a, b . . . n is incremented (at block 112). If (at block 114) the intermediate counter 34a, b . . . n equals an intermediate threshold, e.g., three, then the intermediate counter is reset (at block 116) and control proceeds to block 108 to reconnect to one path to redrive a previously declined update. The intermediate counter 34a, b . . . n acts as a safety valve to allow updates to proceed to a target storage device 4a, b . . . n when the percentage NVS used 32a, b . . . n exceeds the NVS threshold 30. For instance, if the NVS threshold 30 is changed as a result of adding a storage device 4a, b . . . n or RAID rank, then the NVS threshold 32a, b . . . n would decrease, but the NVS counter 32a, b . . . n could exceed the threshold 32a, b . . . n by a significant amount. In such case, the intermediate counter 34a, b . . . n is used to allow updates to the NVS 16 for a target storage device 4a, b . . . n to proceed while the NVS counter 32a, b . . . n exceeds the NVS threshold 30 and is being decremented to reach the new NVS threshold 30, that has been modified downward. Thus, the intermediate counter 34a, b . . . n helps prevent significant delays and timeouts by reconnecting to redrive the previously declined I/O when the NVS threshold has been revised significantly downward below the percentage NVS used variable 32a, b . . . n. With the intermediate counters 34a, b . . . n, processing of the reconnects will not be delayed until the percentage NVS used 32a, b . . . n reaches the new lower NVS threshold 30.

With the described implementations, the failure of one of the storage devices 4a, b . . . n will not prevent updates for other storage devices from being copied to NVS 16 because only a portion of the NVS 16 stores updates for the failed storage device 4a, b . . . n. In this way, NVS 16 space is reserved for updates to the other storage devices. In the prior art, if random updates to one storage device filled the NVS 16, then the rate at which complete status is returned for sequential writes to the other storage devices 4a, b . . . n would slow down to the rate of the random updates filling NVS 16 because the complete status cannot be returned until the random writes clear out of the NVS 16 and make room for sequential writes to the other storage devices. Such an outcome is particularly disadvantageous because sequential writes are destaged and written to storage much faster than non-sequential random writes. With sequential access, more data is written per seek operation than random writes where the disk head must seek to different locations to write the updates.

The described implementations provide a solution to the problem by reserving space in the NVS 16 for each storage device 4a, b . . . n. This technique prevents the NVS 16 from filling-up with random updates to one storage device 4a, b . . . n and delaying the copying of sequential or other writes to the NVS 16 and delaying the return of write complete status to the host 4a, b . . . n. Further, if the storage device 4a, b . . . n whose updates fill the NVS 16 fails, then complete status cannot be returned for updates to the other storage devices 4a, b . . . n because access to the NVS 16 would be blocked.

In certain implementations, the described NVS allocation technique would BE utilized at all times in order to continuously prevent a failure of one storage device from inhabiting access entirely to NVS 16 and delaying the return of write complete status.

Additional Implementations

The described implementations may be realized as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Field Programmable Gate Array (FPGA), Application Specific Integrated Circuit (ASIC), etc.) or a computer readable medium (e.g., magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of the present invention, and that the article of manufacture may comprise any information bearing medium known in the art.

In the described implementations, the logic of FIGS. 4–6 was implemented in the code 12 and executed by the processor 10. The code 12 may comprise computer instructions in a read-only memory, programmable read-only memory, etc., or a magnetic storage medium, such as a disk drive. In alternative implementations, the processor 10 and code 12 may be implemented as a digital hardware device, such as an ASIC, FPGA, etc.

In the described implementations, a percentage NVS used variable 32a, b . . . n is compared against a threshold to determine whether to write an update to NVS 16. In implementations where each update is of a same fixed size, an NVS counter counting the number of updates in NVS 16 for each storage device may be used and compared against a threshold number of updates to determine whether a new update should be written to NVS 16 or deferred.

In the described implementations, the storage controller 6 disconnected from the hosts 2a, b . . . n if adding the update to the NVS 16 would cause the amount of storage space used for updates in the NVS 16 for the target storage device 4a, b . . . n to exceed the NVS threshold 30. In alternative implementations, alternative techniques may be used to cause the host 2a, b . . . n to redrive the I/O operation, such as a busy, incomplete, etc. Alternatively, the storage controller 16 could just cache the updates in the cache 14 and then when space in the NVS 16 becomes available for the target storage device 4a, b . . . n, the update may be copied from the cache 14 to the NVS 16.

The preferred logic of FIGS. 4–6 describes specific operations occurring in a particular order. In alternative implementations, certain of the logic operations may be performed in a different order, modified or removed. Morever, steps may be added to the above described logic and still conform to the described implementations. Further, operations described herein may occur sequentially or certain operations may be processed in parallel.

The described implementations concerned logic implemented in a storage controller managing access to multiple storage devices. The storage controller may comprise a specific storage controller subsystem, such as the International Business Machines, Corp. Enterprise Storage Server** or any other server or other type of device managing access to multiple storage devices.

**Enterprise Storage Server and IBM are trademarks of International Business Machines Corporation.

The storage devices 4a, b . . . n may comprise any non-volatile storage media and system known in the art, such as magnetic hard disk drives. In alternative implementations, the storage device 4 may comprise any storage device known in the art, such as optical disks, tapes, etc.

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for caching updates to one target storage device in a first and second memories, wherein the target storage device is one of a plurality of storage devices, comprising:

determining an allocation of available space in the second memory to the storage devices, wherein a total of the allocation of the available space to all the storage devices exceeds one hundred percent of the available space in the second memory;

receiving an update to one target storage device;

determining whether adding the update to the second memory will exceed the allocation of available space for the target storage device in the second memory; and writing one copy of the update to the second memory if adding the update to the second memory will not exceed the allocation of available space for the target storage device.

2. The method of claim 1, wherein the determination of the allocation of available space in the second memory allocates a percentage of the second memory to each storage device that is greater than total storage space in the second memory divided by a number of the plurality of storage devices.

3. The method of claim 1, wherein the determination of the allocation of available space in the second memory to the storage devices is performed at initialization and whenever one storage device is added or removed to the plurality of storage devices.

4. The method of claim 1, wherein the determination of the allocation of available space in the second memory to the storage devices is based on an amount of storage space in each storage device, wherein the allocation of storage space may differ for the storage devices.

5. The method of claim 1, further comprising:
destaging the updates in the first memory to the target storage device according to a destaging algorithm.

6. The method of claim 1, wherein the target storage device comprises multiple storage units.

7. The method of claim 6 wherein the target storage device comprises a Redundant Array of Independent Disks (RAID), wherein data is written in stripe units across the multiple storage units when writing data to the target storage device, and further comprising:
determining whether the update is a sequential update that is part of a sequential access to the target storage device;
accumulating sequential updates to the target device before destaging sequential updates to the target storage device; and
after accumulating enough sequential updates to fill one stripe unit in the target storage device, writing the accumulated sequential updates to one stripe unit in the target storage device.

8. The method of claim 1, further comprising:
deferring applying the update to the second memory if an amount of storage space in the second memory used by updates to the target storage device after the update is applied would exceed the allocation of available space for the target storage device.

9. The method of claim 8, further comprising:
performing a destage of one update in the second memory to one target storage device;
marking the destaged update for removal from the second memory; and
requesting resubmittal of one deferred update to the target storage device after destaging one update if the amount of space used by updates for the target storage device in the second memory is less than the allocation of available space in the second memory for the target storage device.

10. The method of claim 9, wherein deferring applying the update to the second memory comprises disconnecting from a host that transmitted the update, and wherein requesting resubmittal of one deferred update comprises reconnecting to one previously disconnected host, wherein the reconnected host resubmits one deferred update.

11. The method of claim 9, further comprising:
requesting resubmittal of one deferred update to the target storage device after destaging one update if the amount of space used by updates for the target storage device has exceeded the allocation of available space in the second memory for the target storage device for a predetermined number of consecutive destages.

12. The method of claim 1, wherein the updates to the plurality of storage devices are written to the first and second memories.

13. The method of claim 1, wherein the first memory comprises a volatile memory device and wherein the second memory comprises a non-volatile memory device.

14. A system for caching updates to one target storage device that is one of a plurality of storage devices, comprising:
a first memory;
a second memory;
means for determining an allocation of available space in the second memory to the storage devices, wherein a total of the allocation of the available space to all the storage devices exceeds one hundred percent of the available space in the second memory;
means for receiving an update to one target storage device;
means for determining whether adding the update to the second memory will exceed the allocation of available space for the target storage device in the second memory; and
means for writing one copy of the update to the second memory if adding the update to the second memory will not exceed the allocation of available space for the target storage device.

15. The system of claim 14, wherein the means for determining the allocation of available space in the second memory allocates a percentage of the second memory to each storage device that is greater than total storage space in the second memory divided by a number of the plurality of storage devices.

16. The system of claim 14, wherein the determination of the allocation of available space in the second memory to the storage devices is performed at initialization and whenever one storage device is added or removed to the plurality of storage devices.

17. The system of claim 14, wherein the means for determining the allocation of available space in the second memory to the storage devices bases the determination on an amount of storage space in each storage device, wherein the allocation of storage space may differ for the storage devices.

18. The system of claim 14, further comprising:
means for destaging the updates in the first memory to the target storage device according to a destaging algorithm.

19. The system of claim 14, wherein the target storage device comprises multiple storage units.

20. The system of claim 19, wherein the target storage device comprises a Redundant Array of Independent Disks (RAID), wherein data is written in stripe units across the multiple storage units when writing data to the target storage device, and further comprising:
means for determining whether the update is a sequential update that is part of a sequential access to the target storage device;
means for accumulating sequential updates to the target device before destaging sequential updates to the target storage device; and
means for writing the sequential updates to one stripe unit in the target storage device after accumulating enough sequential updates to fill one stripe unit in the target storage device.

21. The system of claim 14, further comprising:
means for deferring applying the update to the second memory if an amount of storage space in the second memory used by updates to the target storage device after the update is applied would exceed the allocation of available space for the target storage device.

22. The system of claim 21, further comprising:
means for destaging one update in the second memory to one target storage device;
means for marking the destaged update for removal from the second memory; and
means for requesting resubmittal of one deferred update to the target storage device after destaging one update if the amount of space used by updates for the target storage device in the second memory is less than the allocation of available space in the second memory for the target storage device.

23. The system of claim 22, wherein the means for deferring applying the update to the second memory further performs disconnecting from a host that transmitted the update, and wherein the means for requesting resubmittal of one deferred update reconnects to one previously disconnected host, and wherein the reconnected host resubmits one deferred update.

24. The system of claim 22, further comprising:

means for requesting resubmittal of one deferred update to the target storage device after destaging one update if the amount of space used by updates for the target storage device has exceeded the allocation of available space in the second memory for the target storage device for a predetermined number of consecutive destages.

25. The system of claim 14, wherein the updates to the plurality of storage devices are written to the first and second memories.

26. The system of claim 14, wherein the first memory comprises a volatile memory device and wherein the second memory comprises a non-volatile memory device.

27. An article of manufacture including code for caching updates to one target storage device in a first and second memories, wherein the target storage device is one of a plurality of storage devices, comprising:

determining an allocation of available space in the second memory to the storage devices, wherein a total of the allocation of the available space to all the storage devices exceeds one hundred percent of the available space in the second memory;

receiving an update to one target storage device;

determining whether adding the update to the second memory will exceed the allocation of available space for the target storage device in the second memory; and writing one copy of the update to the second memory if adding the update to the second memory will not exceed the allocation of available space for the target storage device.

28. The article of manufacture of claim 27, wherein the determination of the allocation of available space in the second memory allocates a percentage of the second memory to each storage device that is greater than total storage space in the second memory divided by a number of the plurality of storage devices.

29. The article of manufacture of claim 27, wherein the determination of the allocation of available space in the second memory to the storage devices is performed at initialization and whenever one storage device is added or removed to the plurality of storage devices.

30. The article of manufacture of claim 27, wherein the determination of the allocation of available space in the second memory to the storage devices is based on an amount of storage space in each storage device, wherein the allocation of storage space may differ for the storage devices.

31. The article of manufacture of claim 27, further comprising:

destaging the updates in the first memory to the target storage device according to a destaging algorithm.

32. The article of manufacture of claim 27, wherein the target storage device comprises multiple storage units.

33. The article of manufacture of claim 32, wherein the target storage device comprises a Redundant Array of Independent Disks (RAID), wherein data is written in stripe units across the multiple storage units when writing data to the target storage device, and further comprising:

determining whether the update is a sequential update that is part of a sequential access to the target storage device;

accumulating sequential updates to the target device before destaging sequential updates to the target storage device; and after accumulating enough sequential updates to fill one stripe unit in the target storage device, writing the accumulated sequential updates to one stripe unit in the target storage device.

34. The article of manufacture of claim 27, further comprising:

deferring applying the update to the second memory if an amount of storage space in the second memory used by updates to the target storage device after the update is applied would exceed the allocation of available space for the target storage device.

35. The article of manufacture of claim 34, further comprising:

performing a destage of one update in the second memory to one target storage device;

marking the destaged update for removal from the second memory; and requesting resubmittal of one deferred update to the target storage device after destaging one update if the amount of space used by updates for the target storage device in the second memory is less than the allocation of available space in the second memory for the target storage device.

36. The article of manufacture of claim 35, wherein deferring applying the update to the second memory comprises disconnecting from a host that transmitted the update, and wherein requesting resubmittal of one deferred update comprises reconnecting to one previously disconnected host, wherein the reconnected host resubmits one deferred update.

37. The article of manufacture of claim 35, further comprising:

requesting resubmittal of one deferred update to the target storage device after destaging one update if the amount of space used by updates for the target storage device has exceeded the allocation of available space in the second memory for the target storage device for a predetermined number of consecutive destages.

38. The article of manufacture of claim 27, wherein the updates to the plurality of storage devices are written to the first and second memories.

39. The article of manufacture of claim 27, wherein the first memory comprises a volatile memory device and wherein the second memory comprises a non-volatile memory device.

* * * * *